UNITED STATES PATENT OFFICE.

JOHN MURPHY AND NATHANIEL W. LORD, OF COLUMBUS, OHIO.

HYDRAULIC CEMENT.

SPECIFICATION forming part of Letters Patent No. 347,367, dated August 17, 1886.

Application filed May 1, 1886. Serial No. 200,850. (No specimens.)

*To all whom it may concern:*

Be it known that we, JOHN MURPHY and NATHANIEL W. LORD, citizens of the United States, residing at Columbus, in the county of Franklin and State of Ohio, have invented certain new and useful Improvements in Hydraulic Cement; and we do hereby declare the following to be a full, clear, and exact description of the invention, such as will enable others skilled in the art to which it pertains to make and use it.

Our invention relates to an improvement in hydraulic cement; and it consists of a composition formed by a combination of limestone, furnace-slag, salt, clay, and water, in proportions hereinafter stated.

The object of our invention is to produce a cement of great tenacity and durability.

In making our cement we take of limestone, about one hundred parts; of slag, about eighty parts; of clay, about ten parts; of salt, about five parts. The limestone, slag, and clay having been ground together, the mixture is moistened with water containing common salt in a solution until a plastic mass is formed, which is roughly made into blocks of the desired shape. These blocks are then dried and burned by the process usually employed in the manufacture of cement.

It will be readily seen that the addition of clay to the well-known combination of slag and limestone will aid in the desulphurization of the mixture. The water contained in the clay being liberated at the temperature of the kiln, tends to remove the sulphur from the mixture, and thus improve the quality of the cement over that obtained by the use of slag and limestone alone, while the salt, by its fusibility, aids in combining the particles contained in the mixture.

Having thus fully described our invention, what we claim, and desire to secure, is—

A hydraulic cement composed of limestone, furnace-slag, salt, and clay, which ingredients are mixed, burned, and then reduced to powder, substantially as described.

JOHN MURPHY.
NATHANIEL W. LORD.

Witnesses:
H. N. PRICE,
H. L. SHEPHERD.